US005366582A

United States Patent [19]

Freeman et al.

[11] Patent Number: 5,366,582

[45] Date of Patent: Nov. 22, 1994

[54] LABEL SEPARATING APPARATUS

[75] Inventors: Gerald C. Freeman, Norwalk; John J. Balogh, Jr., Trumbull, both of Conn.

[73] Assignee: Pitney Bowes Inc., Stamford, Conn.

[21] Appl. No.: 631,527

[22] Filed: Dec. 21, 1990

[51] Int. Cl.5 .................... B32B 35/00

[52] U.S. Cl. .................... 156/584; 156/344; 221/73

[58] Field of Search .................... 156/584, 344; 226/91, 226/92; 242/84, 67.1 R; 221/73

[56] References Cited

U.S. PATENT DOCUMENTS

| | | | |
|---|---|---|---|
| 2,754,994 | 7/1956 | Cole | 221/73 |
| 3,822,836 | 7/1974 | Troyer et al. | 242/67.1 R X |
| 3,830,442 | 8/1974 | Kubovich et al. | 242/67.1 R X |
| 4,944,827 | 7/1990 | Lilly et al. | 156/584 X |
| 4,973,009 | 11/1990 | Dunlap | 242/67.1 R |
| 5,069,564 | 12/1991 | Kako et al. | 156/584 X |

*Primary Examiner*—Mark Obele

*Attorney, Agent, or Firm*—Robert H. Whisker; Melvin J. Scolnick

[57] ABSTRACT

A label separating mechanism separates labels from a web of release liner upon which the labels are carried. The separating mechanism includes a separator bar, a guide bar, and two support members that hold the bars. The first support member has a "J"-shaped slot and the second support member has a flared mounting hole. One end of the guide bar slides in the slot between a first position and a second position. The other end of the guide bar pivots in the flared hole as the first end slides in the slot. The separator bar is fixed. When the guide bar is in the first position, the two bars define a label release path. When the guide bar is in the second position, a gap is formed to facilitate threading of the web between the bars.

8 Claims, 5 Drawing Sheets

LABEL SEPARATING APPARATUS

FIELD OF THE INVENTION

The subject invention relates to label printers. More particularly it relates to label printers that include a mechanism for separating labels from a continuous web of release liner.

RELATED APPLICATION

The disclosure of U.S. Pat. No. 5,106,448 , assigned to the assigned to the assignee of this application, is incorporated herein by reference.

BACKGROUND OF THE INVENTION

The disclosure of U.S. Pat. No. 4,944,827, entitled "LABEL PRINTING SYSTEM FOR A COMPUTER OUTPUT LINE PRINTER", issued to Norman R. Lilly, et al., and assigned to the assignee of this application, is incorporated herein by reference. Said U.S. Pat. No. 4,944,827 discloses a computer output printer with a bail rod. Attached to the bail rod is a separator rod that defines a path of travel for a web of release liner to which labels are affixed in a regular pattern. The web's path of travel runs past a print head which prints information on the label and then on to a separation edge defined by the separator rod. At the separation edge there is an angle in the path of travel. The angle is sufficiently large to cause the labels, which are stiffer than the liner, to separate from the liner. The label printing system of U.S. Pat. No. 4,944,827 has been found to be quite useful and efficient, particularly as part of parcel processing systems.

In the label printing system of U.S. Pat. No. 4,944,827, and in other known systems, the two rods or bars that define the label release path are held in close proximity to each other. The proximity of the two bars often makes it difficult or inconvenient to thread the label-bearing web along the desired path when the web is loaded into the system. Thus, it is desirable that a label separating apparatus be arranged to facilitate threading of a label-bearing web into the system.

SUMMARY OF THE INVENTION

According to the invention, an apparatus for separating labels from a web of release liner includes a pair of bars for defining a label release path, and structure for mounting the bars. The bars are mounted in the structure so that at least one of the bars is movable, relative to the other bar, between a first position in which the bars define the label release path and a second position in which a gap is formed between the bars to facilitate threading of the web between the bars.

According to another aspect of the invention, the mounting structure includes a j-shaped slot in which one of the bars is movable.

DETAILED DESCRIPTION OF THE PREFERRED EMBODIMENTS

Figure 1:
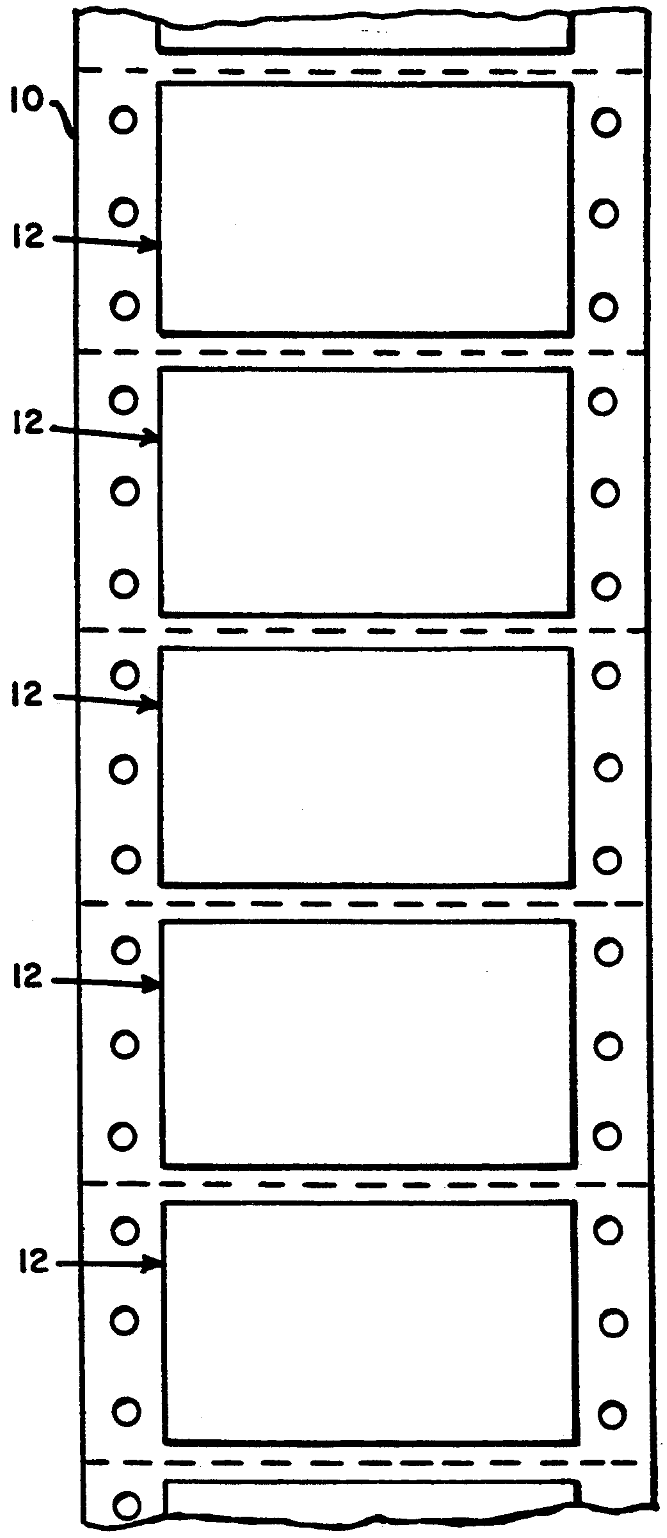
FIG. 1 shows a label-bearing web used with a label printing system that incorporates a label separating apparatus in accordance with the subject invention.

FIG. 1 shows a portion of a label-bearing web 10, carrying labels 12. Web 10 is of the type of label-bearing stock used in the label printing system of the present invention, as well as in prior art systems.

Figure 2:
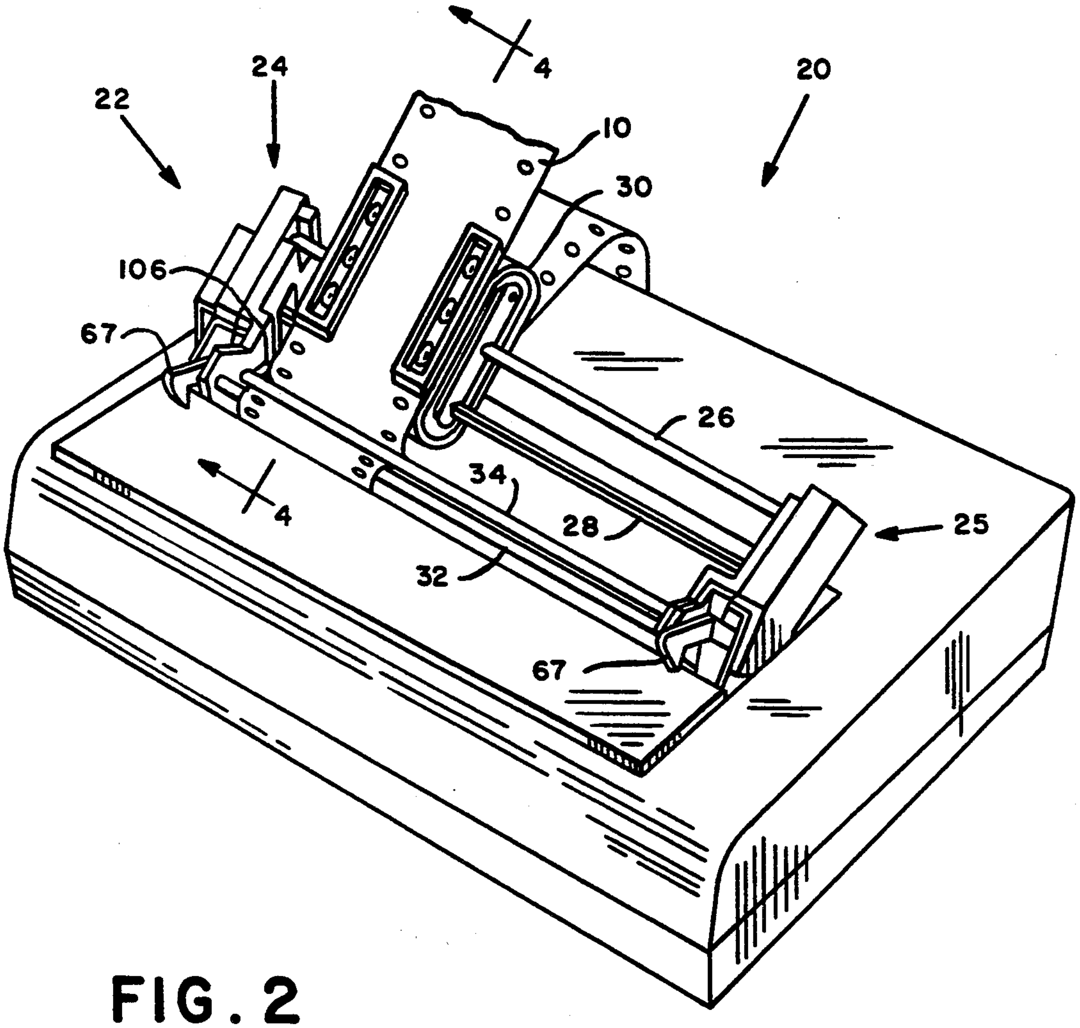
FIG. 2 shows a perspective view of a printer that is part of a label printing system that incorporates the subject invention.

Referring to FIG. 2, printer 20 is a computer output printer. Printer 20 may be adapted from a conventional computer output printer, such as a model M-1809 line printer available from Brother international Corporation, Somerset, N.J. In addition to its conventional elements, printer 20 includes separator assembly 22. Preferably assembly 22 is easily attachable to, and detachable from, printer 20.

Assembly 22 includes oppositely disposed support members 24, 25. Mounted in members 24, 25 and extending therebetween are crossbars 26, 28. Bar 26 is fixedly mounted and bar 28 is mounted for rotation around its longitudinal axis. Bars 26, 28 support a conventional pull tractor 30.

Also mounted in support members 24, 25 are separator bar 32 and guide bar 34. Preferably, bars 32, 34 are both mounted for rotation about their longitudinal axes and are round in cross-section.

Continuous web 10 is shown threaded into printer 20. Web 10 passes between bars 32, 34 and is engaged by pull tractor 30.

Figure 3:
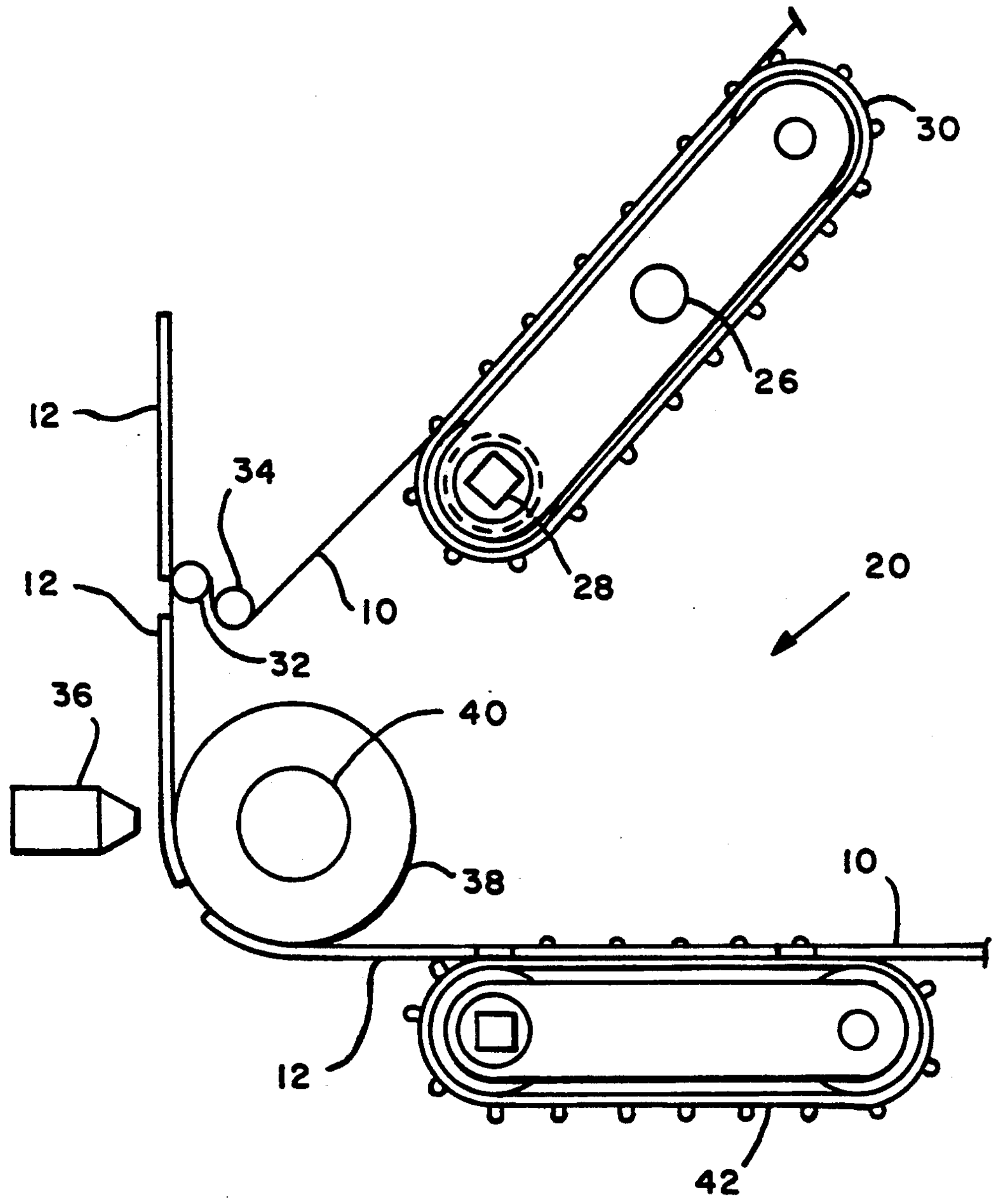
FIG. 3 shows a schematic drawing of the web path through the printer of FIG. 2.

Reference is now also made to FIG. 3, which illustrates in schematic form the path of web 10 through printer 20 as well as further components of printer 20. Printer 20 includes conventional print head 36 for printing on labels or other items, and conventional platen roller 38, mounted on platen shaft 40 for rotation therewith. Printer 20 also includes conventional push tractor 42 that engages web 10.

As discussed in said U.S. Pat. No. 4,944,827, printer 20 is connected to, and operates under control by, a data processing system (not shown). Such a data processing system may be a STAR 110 parcel processing system, or a STAR 200 parcel processing system, both available from Pitney Bowes Inc., Stamford, Conn.

As seen in FIG. 3, a series of labels 12, are carried on web 10. As web 10 is advanced, it passes partially around separator bar 32, between bars 32, 34, and then partially around guide bar 34 on its way to pull tractor 30. The relative positions of platen roller 38, bars 32, 34 and pull tractor 30 are preferably such that the path of web 10 includes a change of direction of approximately 180° or more around the circumference of separator bar 32. The labels carried on web 10 are relatively stiff as compared to web 10 and separate from web 10 as web 10 passes around separator bar 32, which thus defines a separation edge. The 180° change of direction, together with a separator bar 32 having a diameter in cross section of about 5 mm, has been found to provide very effective separation of labels from web 10. The tension applied to web 10 by pull tractor 30 is also important in causing separation of the labels from web 10. As discussed in said U.S. Pat. No. 4,944,827, variations in the adhesive force between the labels and the release liner, and/or in the stiffness of the labels may affect the combination of separation angle, radius of separation edge, and tension applied to the web that are required for satisfactory separation of the labels. Those skilled in the art are readily able to find appropriate combinations of these factors by simple trial and error.

Figure 4B:
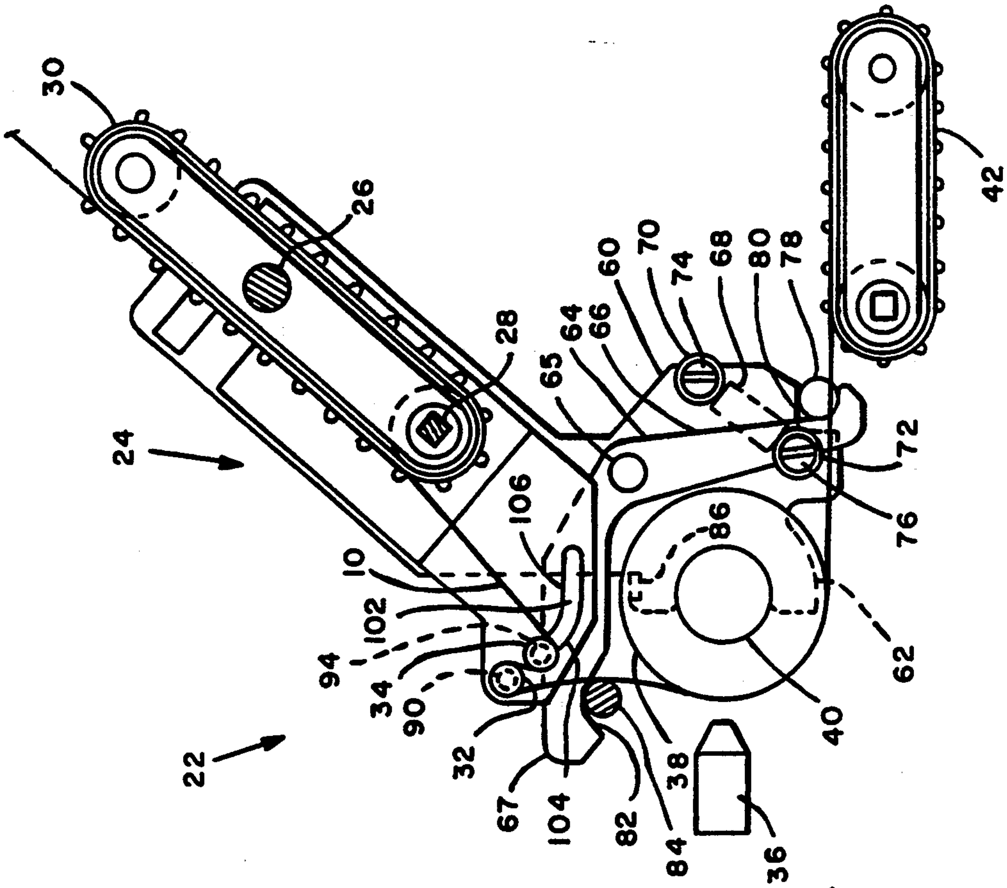
FIGS. 4(*a*), 4(*b*) show semi-schematic cross-sectional views taken on the line 4—4 of FIG. 2.
Figure 4A:
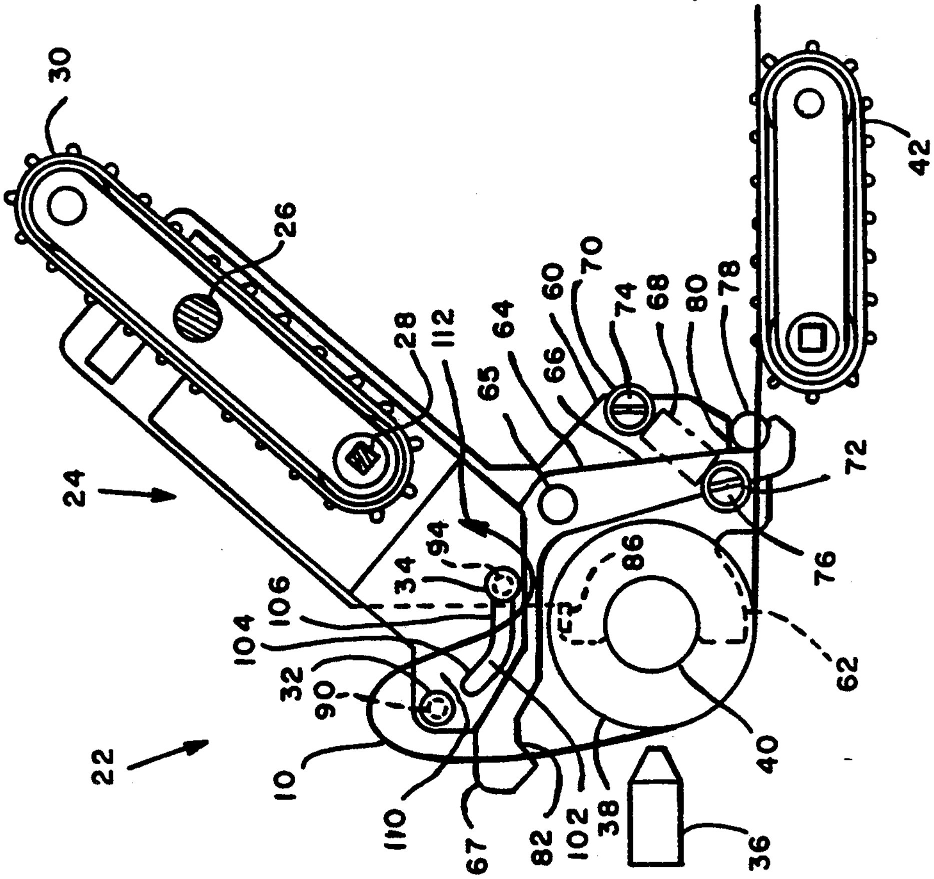

In a preferred embodiment, printer 20 includes push tractor 42 (FIGS. 4(*a*), 4(*b*)). Push tractor 42, together with platen roller 40 and pull tractor 30, advance web 10 for printing on, and separation of, labels 12.

As seen in FIG. 4(*a*) or FIG. 4(*b*), support member 24 includes bracket 60 which has an arcuate portion 62 that fits partially around platen shaft 40 of printer 20 (FIG. 2) and aids in the mounting of separator assembly 22 on printer 20. A pivot arm 64 is pivotally mounted on bracket 60 by means of pivot 65. Pivot arm 64 includes mounting finger 66 and detent latch 67. Coil spring 68 has end rings 70, 72, by which it is respectively secured to pin 74 of bracket 60 and pin 76 of finger 66. Spring 68 biases arm 64 to pivot in a counterclockwise direction about pivot 65 and causes finger 66 to hold a shaft 78 of printer 20 in notch 80 of bracket 60. It will be seen that arcuate portion 62, notch 80 and spring-biased finger 66 cooperate to secure member 24 to shafts 40, 78 of printer 20.

Detent latch 67 includes a notch 82 which restrains conventional spring biased bail bar 84 (shown only in FIG. 4(*b*)) of printer 20. In the absence of the restraining action of latch 67, the tension in web 10 imparted by pull tractor 30 would tend to force bail bar 84 away from platen roller 38, resulting in possible deterioration in print quality. Latch 67 preferably includes a tab (not shown) by which the system operator may readily cause pivot arm 64 to pivot in a clockwise direction to aid in detachment of assembly 22 from, or attachment of assembly 22 to, printer 20. Bracket 60 also has abutment pin 86 which limits counter clockwise pivoting of arm 64 when assembly 22 is detached from printer 20.

Mounting of bars 32, 34 in support members 24, 25, as well as threading of web 10 into assembly 22, will now be discussed in detail. Bars 32, 34 are generally cylindrical, and both have cylindrical ends that have a smaller diameter than the main portions of bars 32, 34. Reference numerals 90, 92, 94, 96 respectively refer to the four ends o f bar 32, 34.

Member 24 includes cylindrical hole 98 and member 25 includes cylindrical hole 100. The diameters of holes 98, 100 are slightly larger than the diameters of ends 90, 92 of bar 32. Ends 90, 92 are respectively held in holes 98, 100 so that bar 32 is mounted in members 24, 25 for rotation about the longitudinal axis of bar 32. Except for that rotation, the position of bar 32 is essentially stationary with respect to members 24, 25.

Member 24 also includes "J"-shaped slot 102 that includes a arcuate portion 104 proximate to hole 98 and a straight portion 106 away from hole 98. The width of slot 102 is slightly larger than the diameter of end 94 of bar 34.

Member 25 has a hole 108 that is proximate to hole 100. Hole 108 has a portion that is cylindrical and another portion that flares outward and away from member 24. The cylindrical portion of hole 108 is slightly larger in diameter than end 96 of bar 108.

End 94 is slidably held in slot 102 and end 96 is pivotally held in flared hole 108, so that bar 34 pivots about hole 108 as end 94 slides in slot 102.

Figure 5A:
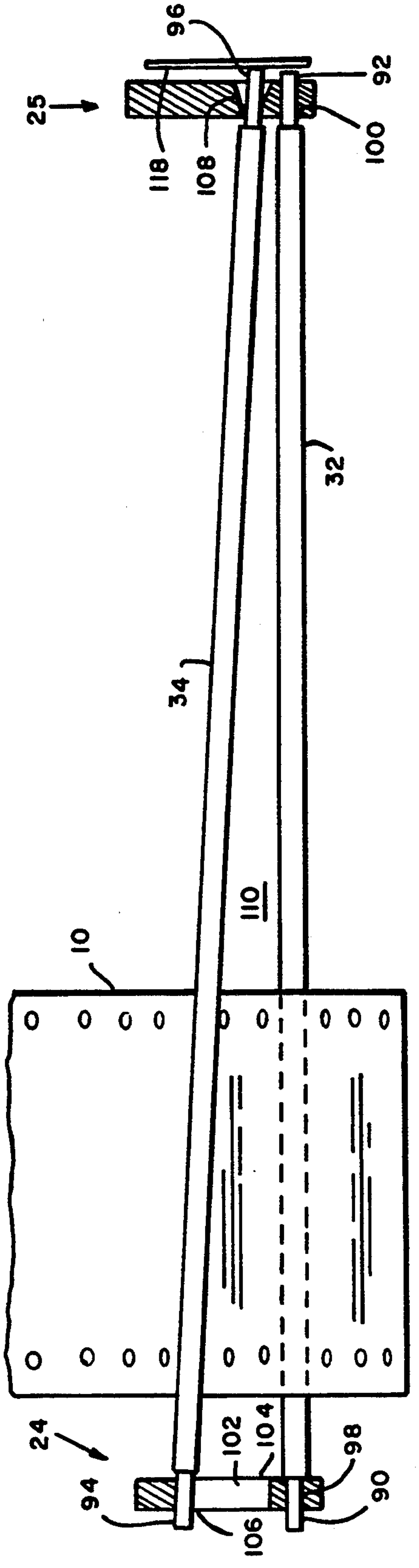
FIGS. 5(*a*), 5(*b*) are semi-schematic views of a label separating apparatus in accordance with the invention.
Figure 5B:
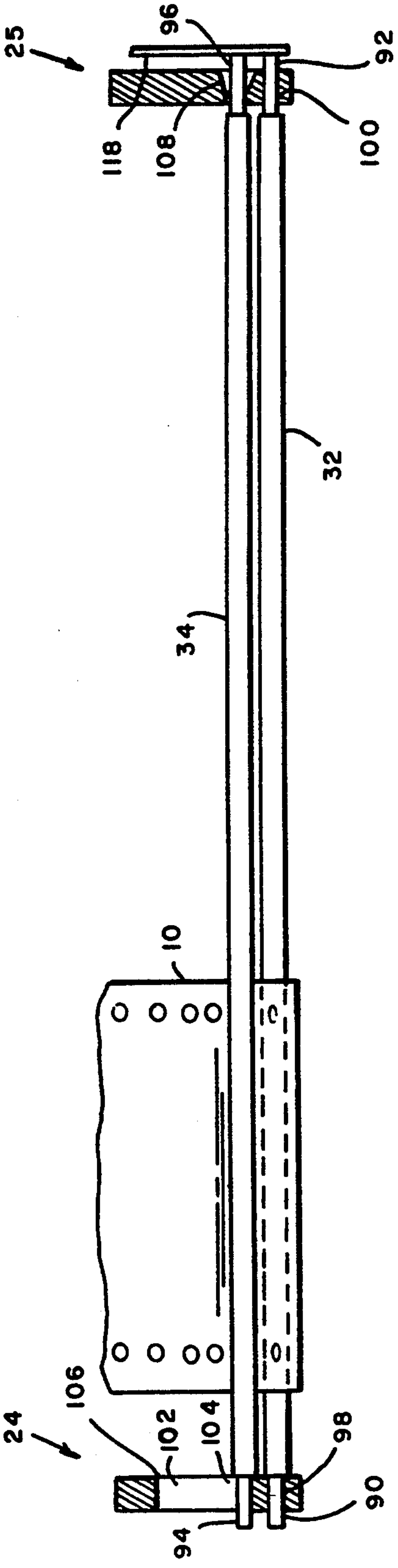

When it is desired to thread web 10 through printer 20 and assembly 22, web 10 is first fed into printer 20 so that it is engaged by push tractor 42. Printer 20 is then operated to advance web 10 around and past platen roller 40 and sufficiently beyond stationary separator bar 32 so that a leader portion of web 10 is available for threading through assembly 22. The operator then slides end 94 of guide bar 34 in slot 102 of member 24 until, as shown in FIG. 4(*a*), end 94 is in portion 106 of slot 102, and preferably is as far as possible from end 90 of bar 32. As best seen in FIG. 5(*a*), there is now formed a gap 110 between bars 32, 34.

As indicated by arrow 112 in FIG. 4(*a*), the operator then threads web 10 through gap 110, and between bars 32, 34. Web 10 is next inserted into pull tractor 30. After web 10 is engaged by tractor 30, the operator manually drives tractor 30 to advance web 10, thereby removing slack in web 10. As the slack is removed, the resulting tension in web 10 forces end 94 to slide in slot 102 toward portion 104. After all of the slack in web 10 is removed, end 94 of bar 34 is forced into the position shown in FIGS. 4(*b*), 5(*b*), so that bars 32, 34 are parallel and proximate. Bars 32, 34 now define the label release path illustrated in FIGS. 3, 4(*b*). It will be appreciated that during normal operation of printer 20 and assembly 22 with web 10 threaded therethrough, considerable tension is maintained on web 10 by pull tractor 30, and that tension is sufficient to hold guide bar 34 in the position of FIGS. 4(*b*), 5(*b*), although bar 34 remains free to rotate about its longitudinal axis as web 10 is advanced.

As will be appreciated by those skilled in the art, gap 110, formed when bars 32, 34 are in their position of FIG. 5(*a*) greatly facilitates threading of web 10 between bars 32, 34. If bars 32, 34 were fixed in their proximity of FIG. 5(*b*), it would be quite difficult and inconvenient to thread web 10 between them. Although in the embodiment described above, only end 94 of guide bar 34 is displaced to form gap 110 with end 96 remaining essentially fixed except for pivotal movement, it will be recognized that a slot similar to slot 102 could be provided in member 25 in place of hole 108, thereby allowing both ends 94, 96 of guide bar 34 to be displaced in order to form gap 110. Further, although in the above described embodiment separator bar 32 is substantially fixed, except for rotation, relative to member 24, 25, it will be recognized that separator bar 32 could be mounted for movement in member 24 and/or member 25, in which case guide bar 34 could, but need not, be substantially fixed relative to members 24, 25.

Member 25, which has not been described in detail up to this point, is preferably a substantially mirror image of member 24, except for the difference as to slot 102 of member 24 vis-a-vis hole 108 of member 25. An additional difference is that member 24 includes a series of gears for driving shaft 28, as previously mentioned. Finally, member 25 preferably includes ground plate 118, which is preferably a conductive metal leaf spring mounted in member 25 so that plate 118 simultaneously contacts ends 92, 96 of bars 32, 34. As bars 32, 34 are preferably composed of a conductive metal, ground plate 118 serves to discharge electrostatic potential differences that are generated between bars 32, 34 as a result of passage of web 10 thereupon.

The above described embodiments have been provided by way of illustration only; other embodiments of the subject invention will be apparent to those skilled in the art from consideration of the above description and the attached drawings. Accordingly, limitations on the subject invention are to be found only in the claims set forth below.

What is claimed is:

1. An apparatus, for separating labels from a web of release liner, comprising:

(a) a pair of bars for defining a label release path;

(b) first means for mounting said bars; said bars being mounted in said first mounting means so that at least one of said bars is movable, relative to the other bar, between a first position in which said bars define said label release path and a second position in which a gap is formed between said bars to facilitate threading of said web between said bars; and, (c) second means for laterally mounting said first mounting means to the platen of an electronic computer printer or typewriter.

2. The apparatus of claim 1, wherein said mounting means comprises a "J"-shaped slot, said at least one bar being held in said slot for sliding movement between said first position and said second position.

3. The apparatus of claim 2, wherein said mounting means further comprises a flared mounting hole and wherein a first end of said at least one bar is held in said slot for sliding movement therein and a second end of said at least one bar is pivotally held in said hole, said second end pivoting in said hole as said first end slides in said slot.

4. The apparatus of claim 3, further comprising means for mounting said apparatus upon a computer output printer, said apparatus separating from said web labels printed by said printer.

5. The apparatus of claim 1, further comprising means for mounting said apparatus upon a computer output printer, said apparatus separating from said web labels printed by said printer.

6. The apparatus of claim 1, wherein said pair of bars consists of a separator bar for defining a separation edge and a guide bar, and wherein said mounting means comprises a first support member and a second support member, said first support member having a "J"-shaped slot, said second support member having a flared mounting hole, a first end of said guide bar being held in said slot for sliding movement therein and a second end of said guide bar being pivotally held in said hole, said second end pivoting in said hole as said first end slides in said slot, said guide bar moving between said first position and said second position, said separator bar having a longitudinal axis and being held in said support members for rotation about said longitudinal axis, said separator bar being otherwise fixed relative to said support members.

7. The apparatus of claim 6, wherein during operation of said apparatus, tension in said web holds said guide bar in said first position.

8. The apparatus of claim 7, further comprising means for mounting said apparatus upon a computer output printer, said apparatus separating from said web labels printed by said printer.

* * * * *